Jan. 7, 1930.
M. B. HARRIS
1,742,766
CONTROLLING APPARATUS
Filed Jan. 12, 1924   4 Sheets-Sheet 1
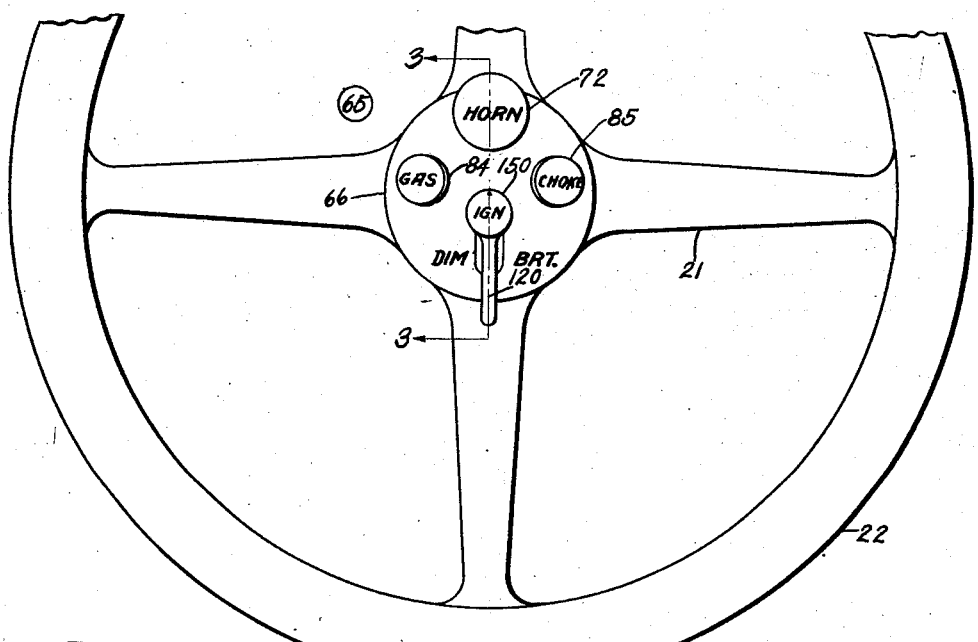
Fig.1
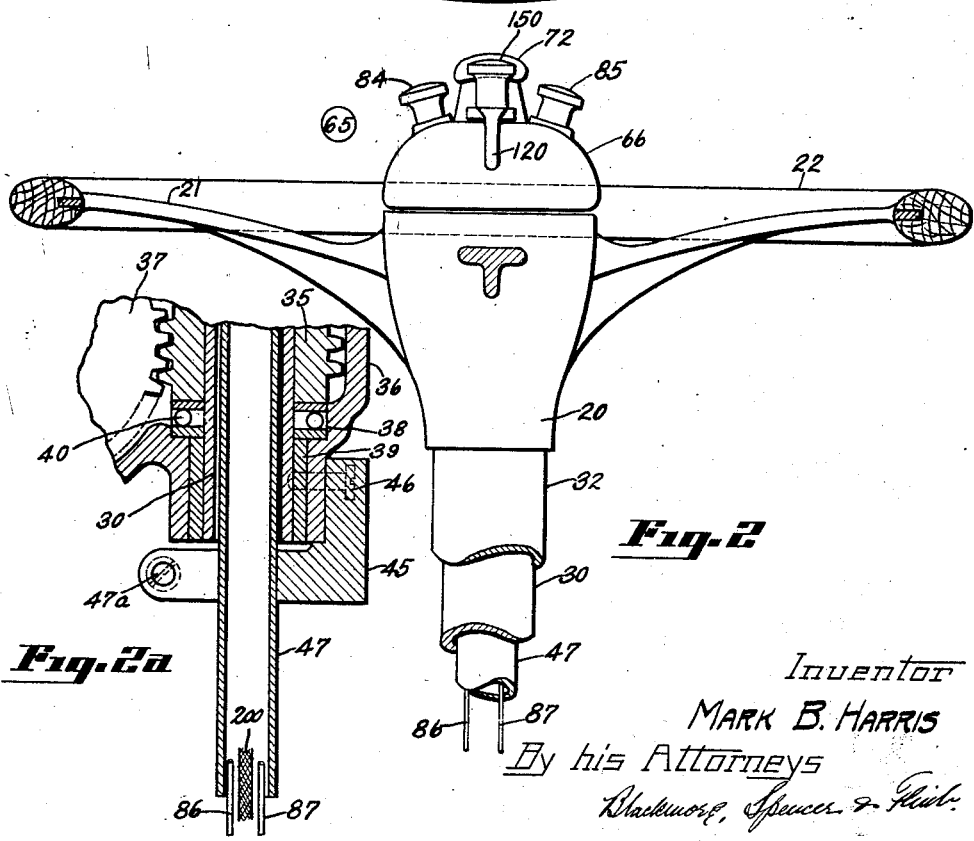
Fig.2
Fig.2a
Inventor
MARK B. HARRIS
By his Attorneys
Blackmore, Spencer & Hiuk Jan. 7, 1930.  M. B. HARRIS  1,742,766
CONTROLLING APPARATUS
Filed Jan. 12, 1924  4 Sheets-Sheet 2

Inventor
MARK B. HARRIS
By his Attorneys

Jan. 7, 1930.  M. B. HARRIS  1,742,766
CONTROLLING APPARATUS
Filed Jan. 12, 1924  4 Sheets-Sheet 3

Inventor
MARK B. HARRIS
By his Attorneys
Blackmore, Spencer & Fleit

Jan. 7, 1930.  M. B. HARRIS  1,742,766
CONTROLLING APPARATUS
Filed Jan. 12, 1924   4 Sheets-Sheet 4
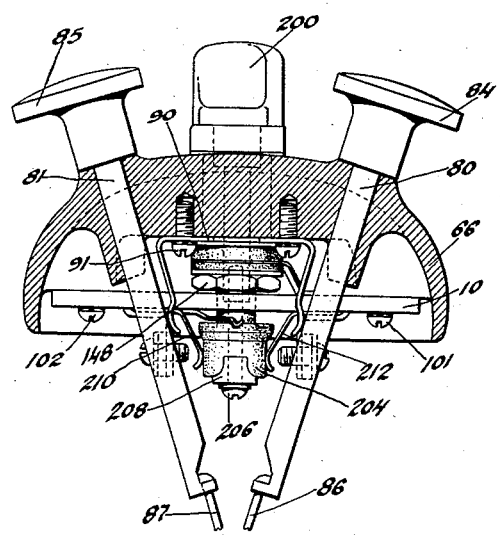
Fig. 14
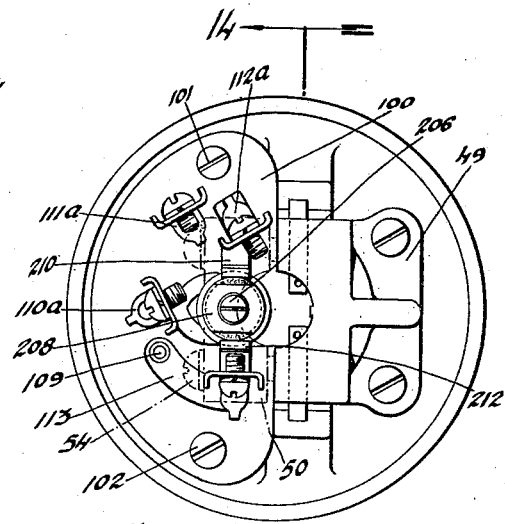
Fig. 15
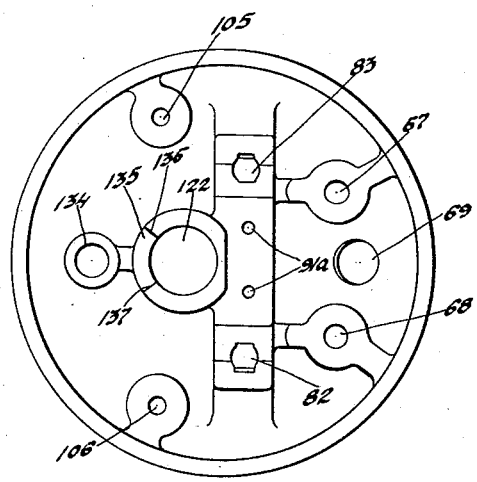
Fig. 16
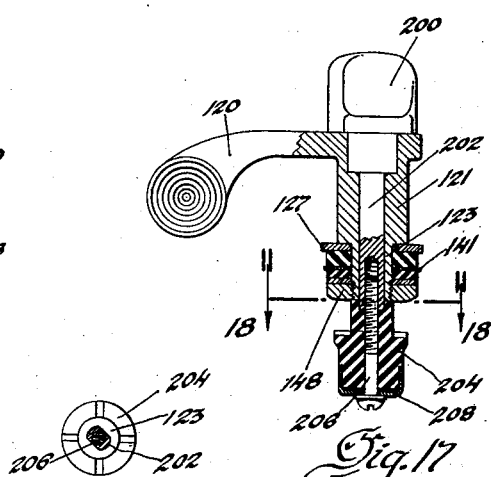
Fig. 17
Fig. 18
Inventor
Mark B. Harris
By his Attorneys
Blackmore, Spencer & Flint Patented Jan. 7, 1930

1,742,766

UNITED STATES PATENT OFFICE

MARK B. HARRIS, OF DETROIT, MICHIGAN, ASSIGNOR TO GENERAL MOTORS CORPORATION, OF DETROIT, MICHIGAN, A CORPORATION OF DELAWARE

CONTROLLING APPARATUS

Application filed January 12, 1924. Serial No. 685,881.

This invention relates to controlling apparatus for motor vehicles, and more particularly to apparatus for controlling the electrical circuits of the vehicle and the carburetor of an internal combustion motor.

It is among the objects of the present invention to control a motor vehicle with least amount of movement of the hands away from the steering wheel.

The present invention provides controlling apparatus mounted adjacent the upper end of the steering post and centrally of the steering wheel in a non-rotatable manner and enclosed by a casing which includes the hub of the steering wheel. The controlling apparatus is mounted so that the electrical and mechanical connections may be made with said apparatus without removing the apparatus from its support, the controlling connections being located within the steering post and hub of the steering wheel.

Other and further objects and advantages of the present invention will be apparent from the following description, reference being had to the accompanying drawings, wherein a preferred form of embodiment of the invention is clearly disclosed.

In the drawings,

Fig. 1 is a fragmentary plan view of the steering wheel of a motor vehicle and controlling apparatus including the present invention;

Fig. 2 is a view in elevation and partly in section of the steering wheel and controlling apparatus;

Figure 3:
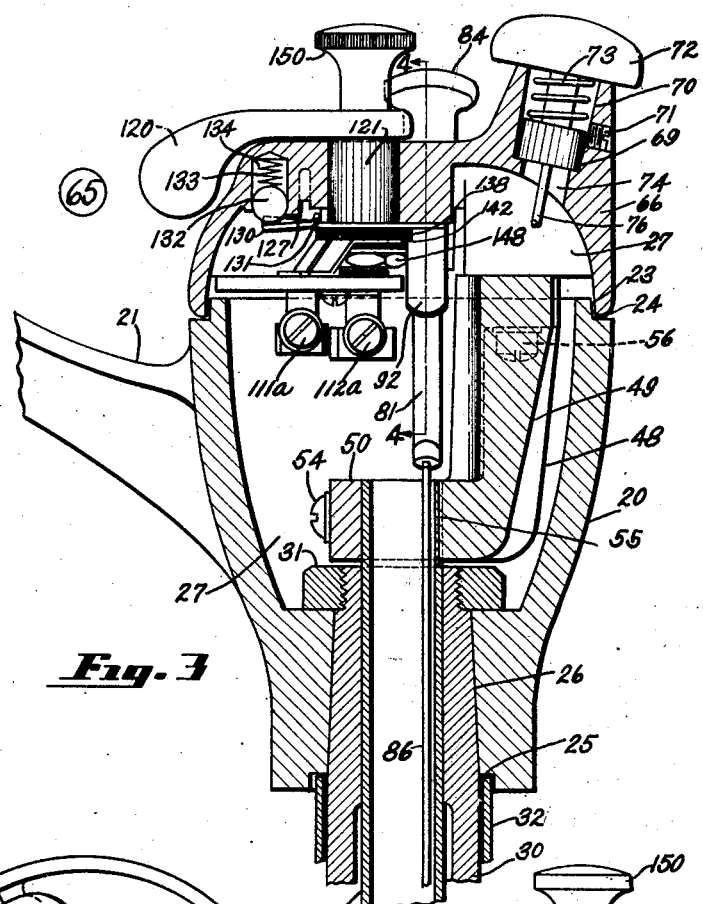
Figure 5:
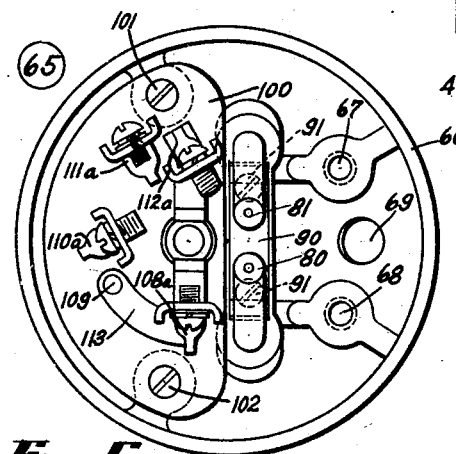
Figure 4:
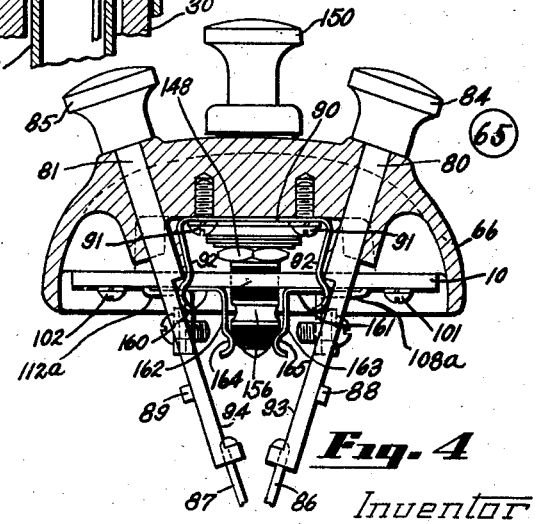
Figure 6:
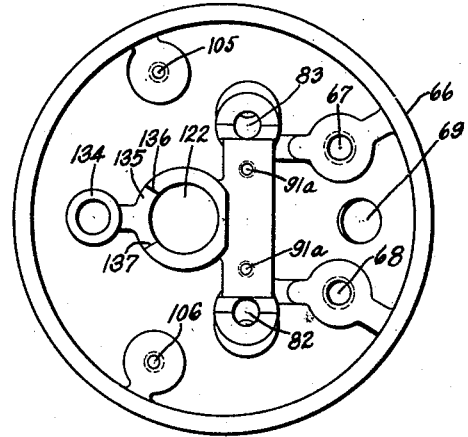
Figure 7:
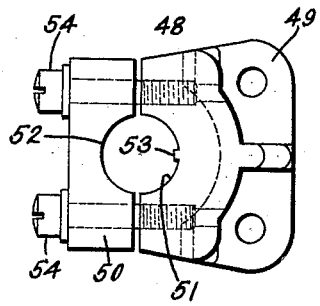
Figure 13:
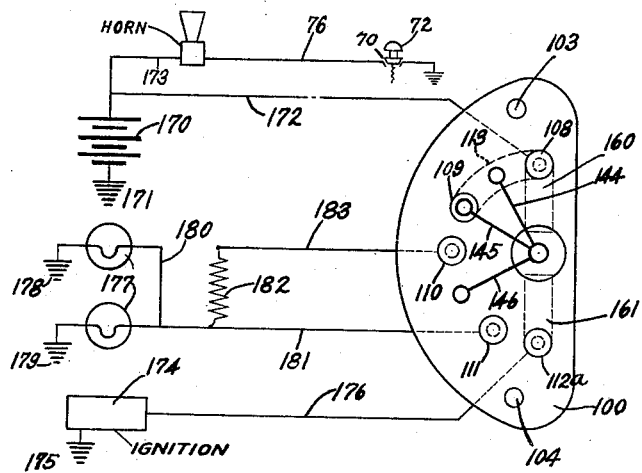
Figure 8:
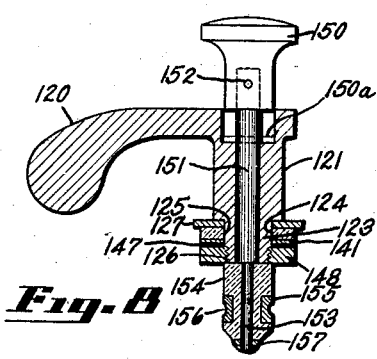
Figure 9:
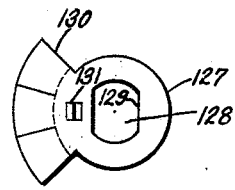
Figure 10:
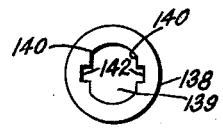
Figure 11:
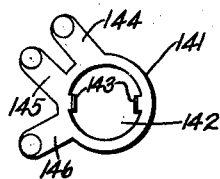
Figure 12:
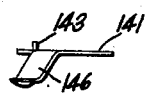

Fig. 2ª is a sectional view of a portion of the lower end of the steering gears and post;

Fig. 3 is a sectional view taken on the line 3—3 of Fig. 1;

Fig. 4 is a sectional view of the controlling apparatus removed from the steering post, the section being taken on the line 4—4 of Fig. 3;

Fig. 5 is a bottom plan view of the controlling apparatus removed from the steering post;

Fig. 6 is a bottom plan view of the controller frame;

Fig. 7 is a bottom plan view of the controller frame bracket;

Fig. 8 is a sectional view of the lighting and ignition switch movable contacts and actuating means;

Fig. 9 is a top plan view of the ratchet plate included in the lighting switch;

Fig. 10 is a top plan view of an insulating washer therefor;

Fig. 11 is a top plan view of the lighting switch contact element;

Fig. 12 is a side view of the switch contact element;

Fig. 13 is a wiring diagram showing the circuit connections employed in the present invention;

Figs. 14, 15, 16 and 17 are respectively views corresponding to Figs. 4, 5, 6 and 8, showing a modification including a different type of ignition switch; and Fig. 18 is a view on the line 18—18 of Fig. 17, showing the connection between the contact-carrying member and the operating member of the ignition switch.

Referring to the drawings, the steering wheel comprises a hollow bowl shaped hub 20, of aluminum or other suitable material, provided with spokes 21 cast integrally therewith to which a rim 22 is attached in any suitable manner. Hub 20 is provided with an annular flange 23 on the upper rim thereof, as viewed in Fig. 3, providing an annular shoulder 24. The base of said hub is provided with an annular recess 25 and a tapered aperture 26, being wider at the bottom than at the top and leading into hub chamber 27. The upper end of hollow steering post 30 is tapered and is received by the aperture 26, a portion of the post extending into the chamber 27 and being threaded to receive a nut 31, which when drawn up on the post 30 secures the hub 20 thereto. A casing 32 surrounds the post 30 and its upper end fits within the recess 25.

As shown in Fig. 2ª, a worm 35, enclosed within a gear case 36 attached to the vehicle frame in any suitable manner, is secured to the lower end of post 30 and cooperates with a worm gear 37 to effect the steering of the motor vehicle in the usual manner. Case 36 is provided with a recess 38 for receiving a bearing 40 for receiving the thrust of worm 35, and bearing 39 is provided for the lower end of post 30.

A clamping bracket 45 is attached to the case 36 by screws 46. A tube passes through post 30 and extends beyond the ends thereof, the lower end of said tube 47 passing through the clamping portion of bracket 45 and clamped in place by screw 47ª.

A clamping bracket 48 comprises portions 49 and 50, provided with semi-cylindrical grooves 51 and 52, respectively. Groove 51 is provided with a key 53 formed integrally therewith. Bracket 48 is clamped about the upper end of tube 47 by bolts 54 passing through the clamp 50 and threaded into clamp 49. The key 53 fits within a groove 55 provided adjacent the upper end of tube 47.

Controller 65, comprising a frame 66 of aluminum or other suitable material, is attached to bracket 48 by screws 56, and is thus supported above the hub 20 in a non-rotatable manner, the flange 23 fitting within the rim of the frame 66. Tube 47 is adjusted with respect to the post 30 by the clamping bracket 45, so that there is a slight clearance between the nut 31 and bracket 48, and between the rim of the frame 66 and the shoulder 24 of the hub 20, thus permitting free rotation of the hub 20. Frame 66 is provided with threaded holes 67 and 68 which are adapted to receive screws 56 which secure the frame 66 to the bracket 48.

Frame 66 is provided with a recess 69 which receives a horn switch 70 of the conventional type which is held in recess 69 by a screw 71. Pressure on button 72 of the switch 70 will close the horn switch contacts, and spring 73 will return the button 72 to normal position to open these contacts. Aperture 74 leads from the recess 69 into the controller chamber 27 provided by the hub 20 and the frame 66. Wire 76 is connected with the horn contacts and passes through aperture 74, through chamber 27, and down through tube 47 to the horn.

Rods 80 and 81 pass through oblique holes 82 and 83 respectively, provided in frame 66, and buttons 84 and 85 respectively are attached thereto. The lower ends of rods 80 and 81 extend into chamber 27 and have attached thereto music wires 86 and 87, respectively, which pass through tube 47 and are connected with the carburetor choke and gas adjusting devices, respectively. Stops 88 and 89 are attached to rods 80 and 81, respectively, and limit the upward movement of said rods by abutment against the frame 66. Rods 80 and 81 are yieldingly maintained in different positions of adjustment by a yoke spring 90 attached to frame 66 by screws 91 engaging threaded holes 91ª, the branches 92 of said spring 90 being received by the grooved portions 93 and 94 of rods 80 and 81, respectively.

The ignition and lighting switch base 100 is secured within frame 66 by screws 101 and 102 which pass through holes 103 and 104, respectively, in said base and engage tapped holes 105 and 106 in frame 66. Metal contacts 108, 109, 110, 111 and 112 are mounted on base 100, contacts 108 and 109 being connected by metal strip 113 located on the outer surface of base 100.

Lighting switch lever 120 includes a hub 121 adapted to pass through aperture 122 in frame 66. Hub 121 is provided with a reduced portion 123 having flats 124 and 125, the lower end of portion 123 being threaded at 126. A ratchet plate 127 is provided with a central opening 128 provided with flats 129 which cooperate with flats 124 and 125. Plate 127 is provided with a corrugated sector 130 and an upstanding ear 131. Sector 130 cooperates with a ball 132 pressed by a spring 133 located in recess 134 in the frame 66. Ear 131, which moves in groove 135 contacts with shoulders 136 and 137 to limit the movement of the switch lever 120. Insulating washer 138 is provided with a central opening 139 bounded by flats 140 and including grooves 142. Washer 138 is located on reduced portion 123, the flats 140 engaging flats 124 and 125. Contact plate 141, having a central opening 142′, upstanding ears 143, and contact fingers 144, 145 and 146, is placed next to the washer 138, the grooves 142 receiving ears 143. An insulating washer 147 is located on the reduced portion 123, and a nut 148 is screwed along the threaded portion 126 to hold the plate 127, washer 138, contact plate 141 and washer 147 securely on the reduced portion 123. Contacts 110 and 111 are connected with terminals 110ª and 111ª, respectively, located on the outer surface of base 100.

Ignition button 150 fits within a recess 150ª provided in hub 121 (see Fig. 8) and is attached to a rod 151 which passes through a central bore in the hub 121 by a pin 152. Rod 151 is provided with a reduced portion 153 extending below the hub 121 and passing through an opening in the switch base 100. A contact block 154 of insulating material, such as bakelite, molded around an annular metal insert 155 provided with an annular groove 156, is attached to the reduced portion 153 by a washer 157 and riveting over the end of portion 153.

Conducting strips 160 and 161 are connected with contacts 108 and 112, respectively, and are provided with resilient branch portions 162 and 163, respectively. These branches 162 and 163 are provided with inwardly extending hook portions 164 and 165 which are adapted to engage with the annular groove 156 in metal insert 155 when the ignition button 150 is in "on" position. Fig. 4 shows the "off" position of the ignition button 150, with the branches 162 and 163 contacting with the insulating block 154. The branches 162 and 163 tend to maintain the button 150 in position. Contacts 108 and 112 are connected with terminals 108ª and 112ª, respectively, located on the outer surface of base 105.

Buttons 72, 85, 84 and 150 bear the indicia Horn, Choke, Gas and Ign (ignition), respectively. The indicia Dim and Brt (bright) are provided on the surface of frame 66 to indicate the position of the lighting switch lever 120 which is shown in Fig. 1 in "off" position.

Referring to Fig. 5 and to the wiring diagram shown in Fig. 13, the battery 170, grounded at 171, is connected with contact 108 by wire 172 and contact 108ª. The horn switch 70 is connected with the horn and battery by wires 76 and 173. The ignition apparatus 174, grounded at 175, is connected with terminal 112ª and contact 112 by wire 176. The head lamps 177, grounded at 178 and 179, are connected with contact 111 by wires 180 and 181 and terminal 111ª. Dimmer resistance 182 is connected with wire 181 and with contact 110 by wire 183 and terminal 110ª.

When it is desired to burn the head lamps brightly, the switch lever 120 is rotated to the right as viewed in Fig. 1, so that the contact finger 144 engages contact 109, finger 145 engages contact 110, and finger 146 engages contact 111. The lighting circuit will then include the battery 170, wire 172, terminal 108ª, contact 108, strip 113, contact 109, finger 144, finger 146, contact 111, terminal 111ª, wires 181 and 180, the head lamps 177, and grounds 178, 179 and 171.

When it is desired to burn the lights dimly, the switch lever 120 is moved to the left as viewed in Fig. 1, so that the finger 144 will engage with contact 108, and finger 146 will engage with contact 110. The ignition circuit will include the battery 170, wire 172, terminal 108ª contact 108, strip 160, insert 155, strip 161, terminal 112ª, wire 176, ignition apparatus 174, and grounds 175 and 171.

When it is desired to adjust the carburetor gas or choke connections, the buttons 85 or 84, respectively, are moved to operate rods 81 or 80, respectively. These rods are held in the required position of adjustment by the resilient branches 92 of spring 90 bearing in the grooves 94 and 93, respectively.

When the horn button 72 is depressed to close the horn switch, current will flow from the battery 170, through wire 173, horn, wire 76, the horn switch which is grounded, and back to the battery through ground 171.

Wires 76, 172, 183, 181 and 176 are lead to the controller 65 through the tube 47, and can be included in a cable 200, indicated in Fig. 2ª.

The modification shown in Figs. 14–18 differs from that described above principally in the substitution of a turn button switch for an axially movable switch for the ignition. In this modified arrangement, an angularly-movable button 200 is operatively connected to a shank 202 passing through an axial bore formed in hub 121. The bottom of the shank 202 is formed with flat sides (Fig. 18) and seats in a socket of corresponding shape in a member 204 of insulating material. The shank is also tapped to receive a screw 206, which holds member 204 in place, and which also secures to said member a contact piece 208, arranged when button 200 is in its "on" position to bridge spring contact fingers 210 and 212, corresponding to branches 162 and 163 described above, thus closing the ignition circuit. In the "off" position, fingers 210 and 212 engage the insulating material of member 204, thus breaking the ignition circuit.

The showing of Fig. 15 differs slightly from that of Fig. 5, in that bracket 49 is shown in place (in bottom plan), and the position of portion 50 is indicated in dotted lines. Rods 80 and 81 are also of somewhat different shape.

From the above it will be apparent that there has been provided a controlling apparatus mounted centrally of the steering wheel and in easy reach of the driver, thus reducing to a minimum the distance through which the driver must move his hand from the steering wheel to operate the controls. The controller 65 can be elevated with respect to the hub 20 by loosening screw 47ª in bracket 45, whereby the rod 47 may be moved upwardly, carrying with it the bracket 48 and frame 66. Thus the apparatus may be held in such position to permit connection or disconnection of wires without removing the controller from the steering post.

It is to be understood that the present invention is not to be limited to the use of the particular controls shown herein, but other controls may be substituted therefor without departing from the scope of the invention.

While the form of apparatus herein shown and described constitutes a preferred form of embodiment of the invention, it should be understood that other forms might be adopted, all coming within the scope of the claims which follow.

I claim:

1. A controller for motor vehicles comprising, in combination, a steering post, a steering wheel carried by the post, an enclosure comprising a movable part carried by the post and a frame, controlling apparatus supported by the frame and including manipulative devices extending outside said frame, and means for holding said frame stationary in various positions of adjustment relative to the movable part.

2. A controller for motor vehicles comprising, in combination, a steering post, a steering wheel carried by the post, an enclosure comprising a movable part providing a hub for the steering wheel and a frame providing a cover over said hub, controlling apparatus supported by the frame within said enclosure and including manipulative devices extending outside said frame, and means for securing said frame in positions spaced at varying distances from the movable part.

3. A controller for motor vehicles comprising, in combination, a stationary part on the vehicle, a steering post supported by said part, a steering wheel carried by the post, an enclosure comprising a movable part carried by the steering column and a frame, controlling apparatus supported by said frame within said enclosure and including manipulative devices extending outside said frame, a support adapted to be moved axially of the steering column and attached to said frame, and means for clamping the support to said stationary part on the vehicle in various positions of adjustment.

4. A controller for motor vehicles comprising, in combination, a stationary part on the vehicle, a steering post supported by said part, a steering wheel carried by the post, an enclosure comprising a movable part carried by the steering column, and a frame, controlling apparatus supported by said frame within said enclosure and including manipulative devices extending outside said frame, a tube slidable through the steering column and attached to said frame, and means for clamping the tube to said stationary part on the vehicle in various positions of adjustment.

5. A controller for motor vehicles comprising, in combination, a steering post and wheel mounted thereon, a stationary tube extending through the steering post and endwise adjustable with respect thereto, a controller including a frame mounted on said tube and spaced therefrom, manually operable devices supported thereby, and connections associated with said devices extending into the space between the frame and tube and down into the tube, and means separate from the frame and cooperating therewith to enclose said connections.

6. A controller for motor vehicles comprising, in combination, a steering post and wheel mounted thereon, a controller including a frame non-rotatably mounted above said steering post centrally of said wheel and movable axially of said post, manually operable devices supported by said frame, connections associated with said devices extending within said post, and means separate from the frame and cooperating therewith to enclose said connections.

7. A controller for motor vehicles comprising, in combination, a steering post mounted on a vehicle frame, a tube passing through said post and having its ends extending beyond the opposite ends of said post, means attached to the vehicle frame and adapted to adjustably clamp the end of said tube adjacent the lower end of said post, a controller including a frame non-rotatably mounted upon the end of said tube adjacent the upper end of said post and spaced therefrom, manually operable devices supported thereby, and connections associated with said devices extending into the space between the frame and tube and down into the tube, and means separate from the frame and cooperating therewith to enclose said connections.

8. A controller for motor vehicles comprising, in combination, a stationary part on the vehicle, a steering post supported by said part, a steering wheel carried by the post, an enclosure comprising a movable part carried by the steering column and a frame, controlling apparatus located within said enclosure and including manipulative devices extending outside said frame, a member extending through the steering column and attached to said stationary part on the vehicle, and means entirely enclosed by said enclosure for attaching the frame to the member.

9. A controller for motor vehicles comprising, in combination, a stationary part on the vehicle, a steering post supported by said part, a steering wheel mounted on the post, an enclosure comprising a movable part supported by the steering post and a frame, a plurality of controlling rods slidably supported by said frame and converging toward the steering post, members attached to said rods and extending through the steering post, and means for attaching said frame to said stationary part on the vehicle.

10. A controller for motor vehicles comprising, in combination, a stationary part on the vehicle, a steering post supported by said part, a steering wheel mounted on the post, an enclosure comprising a movable part supported by the steering post and a frame, a tube attached to said frame and extending through the steering column, means for clamping said tube to said stationary part, a plurality of controlling rods slidably supported by said frame and converging toward said tube and members attached to said rods and extending through said tube.

11. A controller for motor vehicles comprising, in combination, a stationary part on the vehicle, a steering post supported by said part, a steering wheel carried by said post, a controller frame mounted above said post and connected with said stationary part on the vehicle, a controlling rod slidably supported by the frame, and a spring member for frictionally gripping the rod to maintain said rod in various positions of adjustment with respect to said frame.

12. A controller for motor vehicles comprising, in combination, a stationary part on the vehicle, a steering post supported by said part, a steering wheel carried by said post, a controller frame mounted above said column, controlling apparatus supported by said frame, a tube attached at its upper end to the frame and extending through said post, and means for attaching the lower end of said tube to said stationary part, said frame and tube being removable as a unit from the steering post.

13. A controller for vehicles comprising a steering post, a steering wheel thereon having a hub, a frame for carrying manipulating devices positioned over said hub, and with said hub completing an enclosure for operating parts, a member extending through said steering post, means within said enclosure securing said frame to said member, and means below said post securing said member in position.

14. In a vehicle, a rotatable steering post, a steering wheel thereon, a non-rotatable member extending through said post, means below said post for mounting said member, a frame secured to the upper end of said post cooperating with the hub of said steering wheel to constitute an enclosure, the means for fastening said frame and member being within the enclosure.

15. In a vehicle, a rotatable steering post, a steering wheel thereon, a non-rotatable member extending through said post, means below said post for mounting said member, a hollow frame adjacent the upper end of said non-rotatable member, securing means housed by said frame to attach said hollow frame to said non-rotatable member, said frame and said non-rotatable member being movable as a unit through the steering post.

In testimony whereof I affix my signature.

MARK B. HARRIS.